US008838992B1

(12) United States Patent
Zhu et al.

(10) Patent No.: US 8,838,992 B1
(45) Date of Patent: Sep. 16, 2014

(54) IDENTIFICATION OF NORMAL SCRIPTS IN COMPUTER SYSTEMS

(75) Inventors: Xuewen Zhu, Nanjing (CN); Lili Diao, Nanjing (CN); Da Li, Nanjing (CN); Dibin Tang, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 255 days.

(21) Appl. No.: 13/096,453

(22) Filed: Apr. 28, 2011

(51) Int. Cl.
*G06F 21/00* (2013.01)
*G06F 21/56* (2013.01)

(52) U.S. Cl.
CPC .............. *G06F 21/56* (2013.01); *G06F 21/563* (2013.01)
USPC ................................ 713/186; 713/2; 713/164

(58) Field of Classification Search
CPC ...... G06F 21/56; G06F 21/566; G06F 21/563
USPC ........................................ 726/23, 24; 709/206
See application file for complete search history.

(56) References Cited

U.S. PATENT DOCUMENTS

| | | | |
|---|---|---|---|
| 5,442,699 A | 8/1995 | Arnold et al. | |
| 5,452,442 A | 9/1995 | Kephart | |
| 5,640,492 A | 6/1997 | Cortes et al. | |
| 5,649,068 A | 7/1997 | Boser et al. | |
| 5,907,834 A | 5/1999 | Kephart et al. | |
| 6,161,130 A | 12/2000 | Horvitz et al. | |
| 6,192,512 B1 | 2/2001 | Chess | |
| 6,279,128 B1 | 8/2001 | Arnold et al. | |
| 6,622,134 B1 | 9/2003 | Sorkin | |
| 6,650,890 B1 | 11/2003 | Irlam et al. | |
| 6,711,583 B2 | 3/2004 | Chess et al. | |
| 6,732,157 B1 | 5/2004 | Gordon et al. | |
| 6,778,941 B1 | 8/2004 | Worrell et al. | |
| 6,789,200 B1 | 9/2004 | Fiveash et al. | |
| 6,813,712 B1 | 11/2004 | Luke | |
| 7,076,527 B2 * | 7/2006 | Bellegarda et al. | ........... 709/206 |
| 7,089,429 B2 | 8/2006 | Gustafsson | |
| 7,426,510 B1 | 9/2008 | Libenzi et al. | |
| 7,756,535 B1 | 7/2010 | Diao et al. | |

(Continued)

FOREIGN PATENT DOCUMENTS

EP 1 377 892 B1 9/2004
WO WO 02084429 A1 10/2002

OTHER PUBLICATIONS

Yarima, "Analysis of Bayesian Classification-based approaches for Android malware detection", 2014, IEEE, vol. 8, p. 25-36.*

(Continued)

*Primary Examiner* — Thanhnga B Troung
*Assistant Examiner* — Gregory Lane
(74) *Attorney, Agent, or Firm* — Okamoto & Benedicto LLP

(57) ABSTRACT

A machine learning model is used to identify normal scripts in a client computer. The machine learning model may be built by training using samples of known normal scripts and samples of known potentially malicious scripts and may take into account lexical and semantic characteristics of the sample scripts. The machine learning model and a feature set may be provided to the client computer by a server computer. In the client computer, the machine learning model may be used to classify a target script. The target script does not have to be evaluated for malicious content when classified as a normal script. Otherwise, when the target script is classified as a potentially malicious script, the target script may have to be further evaluated by an anti-malware or sent to a back-end system.

19 Claims, 4 Drawing Sheets

(56) References Cited

U.S. PATENT DOCUMENTS

| | | | | |
|---|---|---|---|---|
| 8,370,938 | B1* | 2/2013 | Daswani et al. | 726/23 |
| 8,402,543 | B1* | 3/2013 | Ranjan et al. | 726/23 |
| 2006/0075494 | A1* | 4/2006 | Bertman et al. | 726/22 |
| 2006/0122957 | A1* | 6/2006 | Chen | 707/1 |
| 2006/0259543 | A1 | 11/2006 | Tindall | |
| 2007/0233463 | A1 | 10/2007 | Sparre | |
| 2010/0195909 | A1* | 8/2010 | Wasson et al. | 382/176 |
| 2011/0040825 | A1* | 2/2011 | Ramzan et al. | 709/203 |
| 2012/0084859 | A1* | 4/2012 | Radinsky et al. | 726/23 |

OTHER PUBLICATIONS

Mama: Scripting—quantities and sizes—Dev.Opera, Dec. 12, 2008, 1 sheet [retrieved on Apr. 22, 2011], retrieved from the internet: http://dev.opera.com/articles/view/mama-scripting-quantities-and-sizes/.

InfoGainAttributeEval—Pentaho Data Mining—Pentaho Wiki, 1 sheet [retrieved on Apr. 22, 2011], retrieved from the internet: http://wiki.pentaho.com/display/DATAMINING/InfoGainAttributeEval.

Lex (software)—Wikipedia, the free encyclopedia, 1 sheet [retrieved on Apr. 22, 2011], retrieved from the internet: http://en.wikipedia.org/wiki/Lex_(software).

Weka:W-InfoGainAttributeEval—Rapid-I-Wiki, 2 sheets [retrieved on Apr. 22, 2011], retrieved from the internet: http://rapid-i.com/wiki/index.php?title=Weka:W-InfoGainAttributeEval.

Tf-idf—Wikipedia, the free encyclopedia, 4 sheets [retrieved on Apr. 22, 2011], retrieved from the internet: http://en.wikipedia.org/wiki/Tf%E2%80%93idf.

Support vector machine—Wikipedia, the free encyclopedia, 11 sheets [retrieved on Apr. 22, 2011], retrieved from the internet: http://en.wikipedia.org/wiki/Support_vector_machine.

* cited by examiner

IDENTIFICATION OF NORMAL SCRIPTS IN COMPUTER SYSTEMS

BACKGROUND OF THE INVENTION

1. Field of the Invention

The present invention relates generally to computer security, and more particularly but not exclusively to methods and apparatus for identifying normal scripts.

2. Description of the Background Art

Scripts, such as JavaScript, are commonly employed to enhance user web browsing experience. Websites deliver scripts along with web pages to add functionality and features. However, scripts can also be used to exploit web browser or plug-in vulnerabilities. Various techniques for combating malicious codes may also be used against malicious scripts. Some malicious scripts employ some form of encryption to make them harder to detect. For example, malicious scripts may use "unescape" or other custom functions to avoid detection. Encrypted malicious scripts may need to be decrypted before they can be evaluated. Malicious scripts in clear text may be detected at the client level by emulation. Regardless, detection of malicious scripts consumes a lot of computing resources, slowing down the computer and rendering of the web page.

SUMMARY

In one embodiment, a computer-implemented method of identifying normal scripts includes receiving a machine learning model and a feature set in a client computer, the machine learning model being trained using sample scripts that are known to be normal and known to be potentially malicious and takes into account lexical and semantic characteristics of the sample scripts. A target script is received in the client computer along with a web page, the target script and the web page being received from a server computer over a computer network. Features of the target script that are included in the feature set are extracted. The extracted features of the target script are input into the machine learning model to receive a classification of the target script. The target script is detected to be a normal script and not a potentially malicious script based on the classification of the target script.

In another embodiment, a client computer comprises a processor configured to execute computer-readable program code stored non-transitory in a computer-readable medium, the computer-readable medium comprises a web browser, an anti-malware, a machine learning model, and a normal script identifier configured to determine whether a script is a normal script by having the script classified by the learning model and to allow the script to be used by the web browser without first having the script evaluated by the anti-malware for malicious content in response to detecting that the script is a normal script and not a potentially malicious script.

In another embodiment, a computer-implemented method of identifying normal scripts comprises using a machine learning model to determine a classification of a first script in a client computer, detecting that the first script is a normal script based on the classification of the first script, and foregoing evaluation of the first script by an anti-malware in response to detecting that the first script is a normal script.

These and other features of the present invention will be readily apparent to persons of ordinary skill in the art upon reading the entirety of this disclosure, which includes the accompanying drawings and claims.

Figure 1:
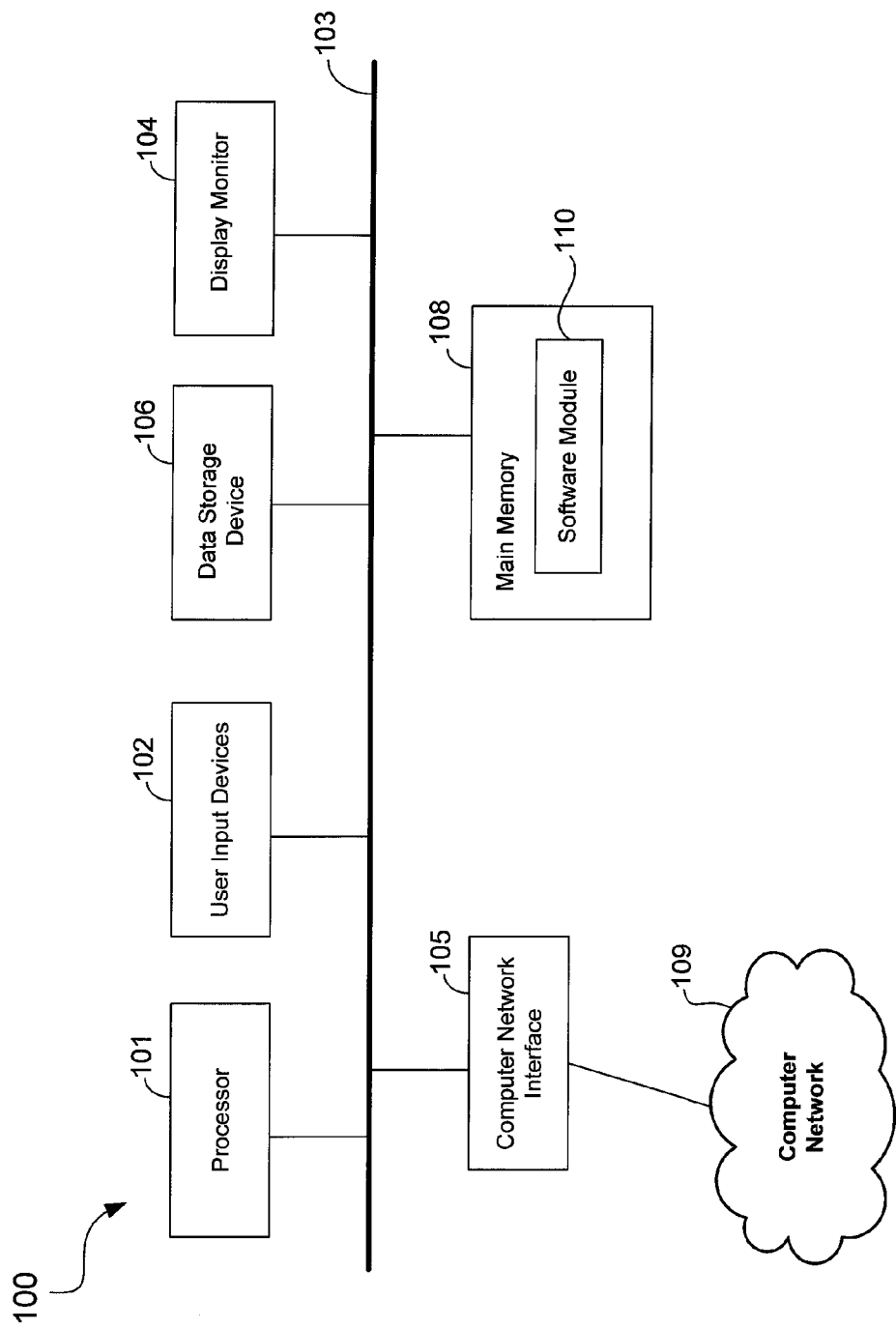
FIG. 1 shows a schematic diagram of a computer in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

JavaScript, VBscript, Jscript, and Action Script are examples of commonly-used scripts. As employed on the World Wide Web, scripts are used to perform various functions. The following is an example normal (i.e., non-malicious, safe) script for checking user input submitted to a form, such as an HTML form. The normal script includes the words "Form" ("ValidateForm") and "Check" as attributes.

```
function ValidateForm( ) {
    var Check = 0;
    if (document.LOGIN.UserName.value == '') { Check = 1; }
    if (document.LOGIN.PassWord.value == '') { Check = 1; }
    if (Check == 1) {
        alert("Please enter your name and password before continuing");
        return false;
    } else {
        document.LOGIN.submit.disabled = true;
        return true;
    }
}
```

Some normal scripts are employed to show user interface effects (e.g., menu, Tree). For example:
    document.oncontextmenu=new Function("return false");
// disable context menu
Some normal scripts are employed to show Flash content using a common flash JS library. For example:
    swfobject.embedSWF('rosso.swf', 'flashArea', '100%', '100%', '9.0.0', false, { }, {bgcolor: '#990000'}, {id: 'ross'});
Some normal scripts are used for website traffic analysis. The following is an example normal script for calling the Google® traffic statistics service.
    var pageTracker=_gat._getTracker("UA-4970491-2");
    pageTracker._initData( );
    pageTracker._trackPageview( );
The inventors observed that normal scripts for performing a particular function use the same framework and thus have similar structures. In contrast, malicious scripts are typically encrypted, making it difficult to determine their function, such as in the following example:
    function Y7zWI(Zv95y){return Zv95y.replace(/%/g,'').replace(/[Lj'tqx]/g,yoKA)}
    QPI2K='q64ocj75mt65nq74.wx7 . . . '

```
nBGG=2;try{if(yoKA='a')throw    new    ReferenceError
(nBGG);}catch(nBGG){yoKA=nBGG;            nBGG=5;
yoKA=yoKA.message;
    yoKA=String.fromCharCode(30+nBGG+2)+Y7zWI('j'+
nBGG);
    yoKA=unescape(yoKA.toString(        ));yoKA=Y7zWI
(yoKA+QPI2K)}
    eval(unescape(yoKA));
```
Some clear (i.e., unencrypted) malicious scripts are relatively easy to identify. For example:
```
    var                            shellcode=unescape("%
u2f9f%u3747%u4797%u939f%u9bf8%u ... ");
    var bigblock=unescape("%u9090%u9090");
    var headersize=20;
    var slackspace=headersize+shellcode.length;
    while (bigblock.length<slackspace) bigblock+=bigblock;
```

The function of clear scripts, both normal and malicious, may be determined based on their employment of meaningful words. Encrypted scripts, on the other hand, lack meaningful words, making it difficult to describe the functionality or purpose of the script. Regardless, whether a malicious script is encrypted or not, detecting malicious scripts consumes a lot of computing resources. The inventors observed, however, that most scripts are normal and less than 0.1% of scripts received over the Internet are malicious. The inventors come to the conclusion that emulating or decrypting scripts to detect malicious scripts is not an efficient use of computing resources. However, there is still the need to screen scripts to guard against the occasional malicious script.

In one embodiment, a normal script is identified by lexical semantic analysis. Lexical characteristic of a script is structure information of a script. For example, lexical analysis of a script may involve determining the number of lines and comments that a script has or whether the script has a well-understood format. Semantic characteristic of a script is the use of meaningful words in the script. For example, semantic analysis of a script may involve determining whether it is possible to relate the appearance of the word "Menu" in the script to some menu operation, or to relate the appearance of the word "Flash" in the script to an operation to display a flash movie. By identifying normal scripts, the number of scripts that need to be decrypted, emulated, or otherwise checked for malicious content is advantageously reduced.

Referring now to FIG. 1, there is shown a schematic diagram of a computer 100 in accordance with an embodiment of the present invention. The computer 100 may be employed as a training computer 220, a client computer 230, or a server computer 240 (see FIG. 2), for example. The computer 100 may have fewer or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. The software modules 110 may be loaded from the data storage device 106 to the main memory 108. The software modules 110 may also be made available in other computer-readable medium including optical disk, flash drive, and other memory device. The software module 110 may comprise computer-readable program code components of the training computer 220, the client computer 230, or the server computer 240.

Figure 2:
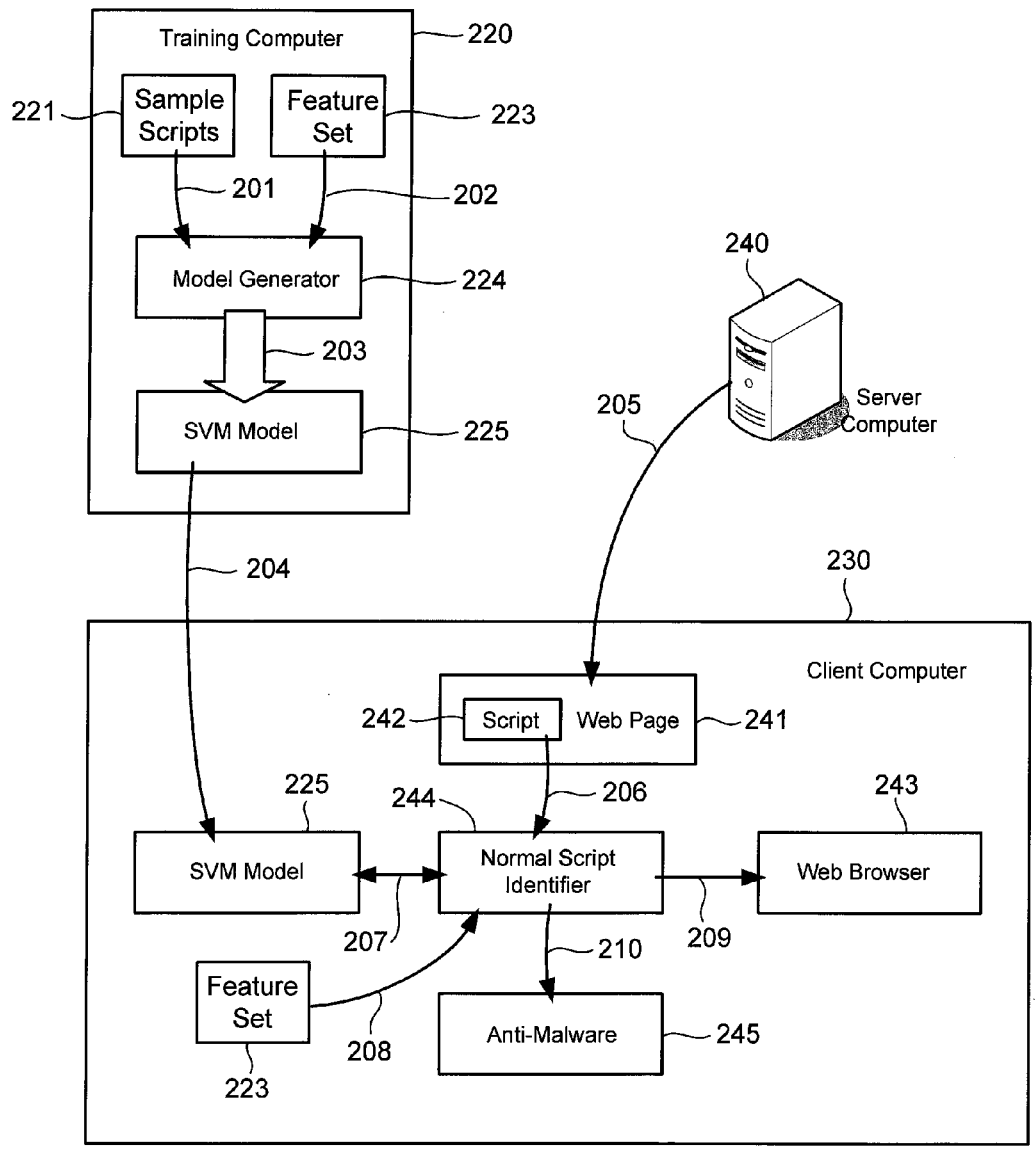
FIG. 2 shows a flow diagram schematically illustrating operation of a computer system to detect normal scripts in accordance with an embodiment of the present invention.

FIG. 2 shows a flow diagram schematically illustrating operation of a computer system to detect normal scripts in accordance with an embodiment of the present invention. In the example of FIG. 2, the computer system comprises the training computer 220, the client computer 230, and the server computer 240.

The training computer 220 may comprise a server computer for building a machine learning model, which in the example of FIG. 2 comprises a support vector machine (SVM) model 225. The training computer 220 may comprise sample scripts 221, a feature set 223, a model generator 224, and the SVM model 225. As will be more apparent below, the SVM model 225 built in the training computer 220 may be forwarded to the client computer 230 to be employed by a normal script identifier 244 to identify normal (i.e., non-malicious, safe) scripts.

The model generator 224 may comprise computer-readable program code configured to be executed by the processor of the training computer 220 to build the SVM model 225 by training using a plurality of sample scripts 221 and a feature set 223. In one embodiment, the sample scripts 221 comprise samples of known normal scripts and samples of scripts that are known to be potentially malicious and hence needed to be checked. The feature set 223 may comprise attributes that are typically present in normal scripts and potentially malicious scripts. The attributes in the feature set 223 are also referred to as "features" because they are used to select attributes from a script for use as features in a feature vector. Similarly, attributes selected or extracted from a script are also referred to as "features." Attributes may comprise words or variables that are indicative of normal scripts or potentially malicious scripts.

The model generator 224 may receive the sample scripts 221 (arrow 201) and the feature set 223 (arrow 202) to build and train the SVM model 225 (arrow 203) to classify a script as either a normal script or a potentially malicious script. The SVM model 225 and the feature set 223 are subsequently received by the client computer 230 from the training computer 220 (arrow 204). The training computer 220 may be maintained and operated by the vendor of the anti-malware 245, for example.

The client computer 230 may comprise a computer employed by a user to receive web documents, such as a web page 241. The client computer 230 may comprise the SVM model 225, the feature set 223, the web page 241, the script 242, the web browser 243, the normal script identifier 244, and the anti-malware 245. In the example of FIG. 2, the web page 241 is received over the Internet from a website hosted by the server computer 240 (arrow 205). The web page 241 may be received from the website along with the script 242, which may be a JavaScript. The script 242 may be embedded in the web page 241. Embodiments of the present invention may also be employed on outbound scripts. That is, the normal script identifier 244 may also be employed to determine whether a script that is transmitted from the client computer 230 is normal.

The normal script identifier 244 may comprise computer-readable program code configured to be executed by the processor of the client computer 230 to determine whether the script 242 is a normal script or a potentially malicious script.

In one embodiment, the normal script identifier 244 uses the feature set 223 (arrow 208) to extract features from the script 242 (arrow 206), and uses the extracted features to generate a feature vector. The normal script identifier 244 inputs the feature vector into the SVM model 225, which classifies the script 242 as either a normal script or a potentially malicious script (arrow 207). The normal script identifier 244 allows the script 242 to be employed by the web browser 243 without being evaluated by the anti-malware 245 when the script 242 is classified as a normal script (arrow 209). For example, the script 242 does not have to be decrypted, emulated, or checked for malicious content when the script 242 is deemed to be a normal script and not a potentially malicious script. Otherwise, when the script 242 is classified as a potentially malicious script, the normal script identifier 244 initiates evaluation of the script 242 by the anti-malware 245 (arrow 210).

The anti-malware 245 may comprise computer-readable program code configured to be executed by the processor of the client computer 230 to evaluate the script 242 for malicious content. The anti-malware 245 may determine whether or not the script 242 comprises malicious code by decrypting the script 242 if it is encrypted, performing emulation of the script 242, or scanning the script 242 using a pattern matching algorithm, for example. The anti-malware 245 may also employ other means of detecting malicious code without detracting from the merits of the present invention. The anti-malware 245 may allow the web browser 243 to employ the script 242 when the script 242 is deemed to be normal. Otherwise, when the script 242 comprises malicious code, the anti-malware 245 may perform one or more responsive actions including blocking and removing the script 242 and the web page 241, blocking communications to and from the server computer 240, and alerting the user or administrator of the client computer 230.

Figure 3:
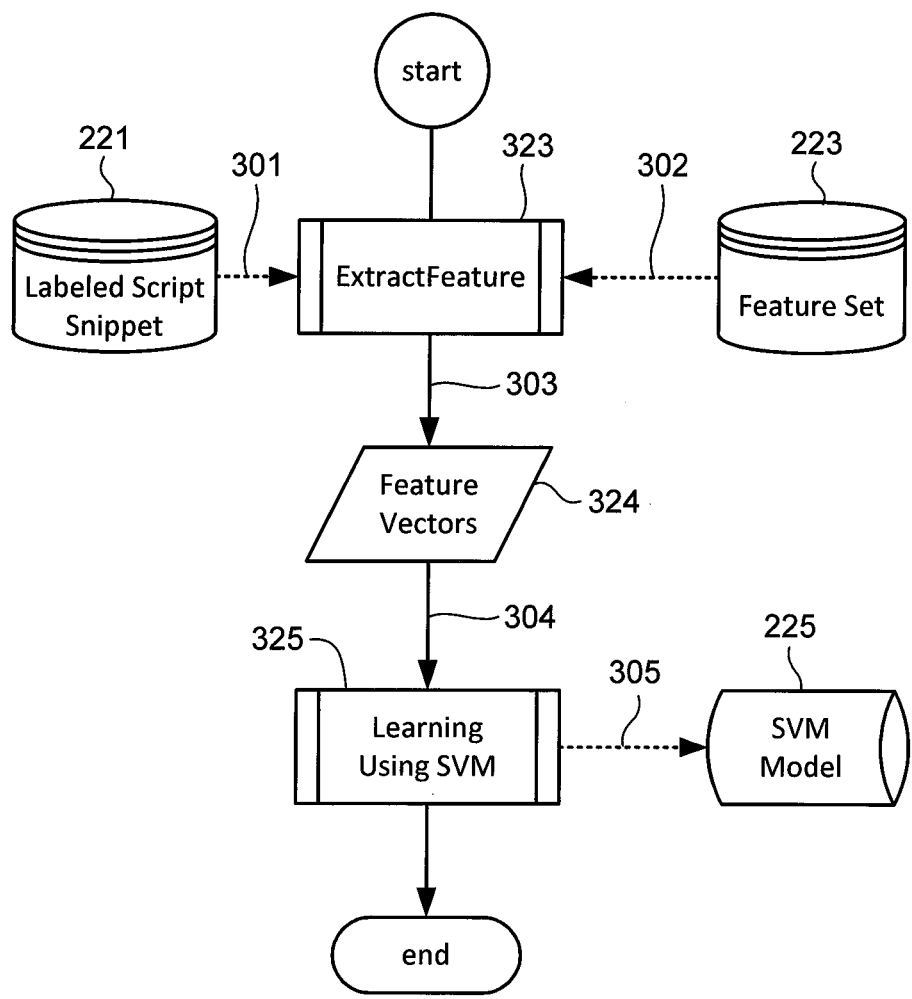
FIG. 3 shows a flow diagram of a method of building a machine learning model for use in identifying normal scripts in accordance with an embodiment of the present invention.
Figure 4:
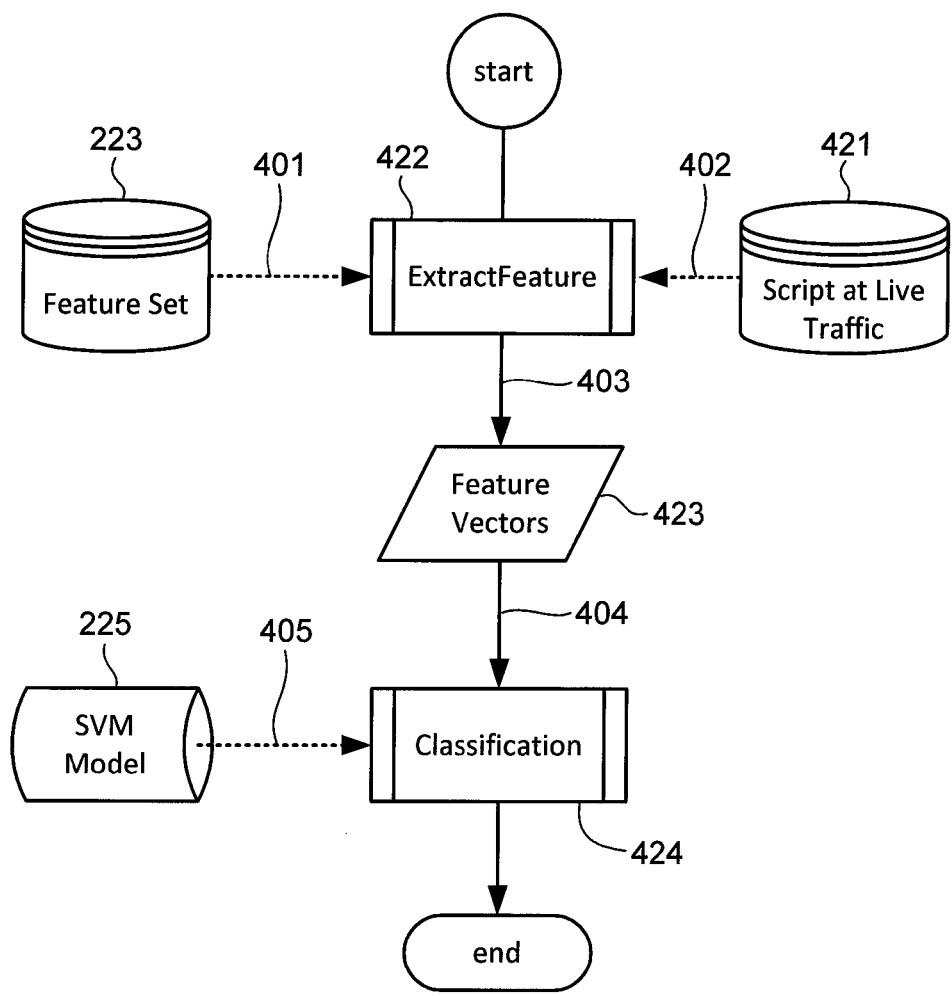
FIG. 4 shows a flow diagram of a method of identifying normal scripts in accordance with an embodiment of the present invention.

FIGS. 3 and 4 show flow diagrams schematically illustrating identification of normal scripts in web documents in accordance with an embodiment of the present invention. In the example of FIGS. 3 and 4, identification of normal scripts is performed in two stages: a training stage illustrated in FIG. 3 and a prediction stage illustrated in FIG. 4. The training stage may be performed in the training computer 220 and the prediction stage may be performed in the client computer 230.

FIG. 3 shows a flow diagram of a method of building a machine learning model for use in identifying normal scripts in accordance with an embodiment of the present invention. The steps shown in FIG. 3 may be performed using components of the training computer 220. For example, the step for extracting features (step 323) and step for learning using SVM (step 325) may be performed by the model generator 224 in the training computer 220. In the example of FIG. 3, the model that is built is a learning model comprising the SVM model 225. The method of FIG. 3 involves providing sample scripts 221 and the feature set 223. In the example of FIG. 3, the sample scripts 221 is noted as "Labeled Script Snippet" to indicate that the sample scripts 221 are not necessarily complete scripts, but relevant portions of scripts.

The sample scripts 221 may comprise two sets of scripts: a set of known normal scripts and a set of known potentially malicious scripts. In one embodiment, each script in the set of known normal scripts is tagged as "Bypass" to indicate that these scripts are known to be normal and safe, and can thus bypass anti-malware operations. Each script in the set of known potentially malicious scripts is tagged as "NeedToCheck" to indicate that these scripts need to be checked by the anti-malware 245. The scripts tagged as NeedToCheck may need to be emulated at the client level or sent to a back-end system of the computer security vendor for further analysis.

The feature set 223 may comprise attributes indicative of whether a script is normal or potentially malicious. In one embodiment, the feature set 223 comprises highly relevant attributes (e.g., words and/or variables) selected from an initial set of attributes. In one embodiment, the initial set of attributes comprises over 30,000 attributes selected by statistics. Some 4,000 out of the over 30,000 attributes may then be selected for inclusion in the feature set 223. The selected attributes included in the feature set 223 may be chosen using the Weka (Waikato Environment for Knowledge Analysis) InfoGainAttributeEval method, for example. Examples of selected attributes include the words "StringFromCode", "escape", "shellcode", and "u9090", which are indicative of potentially malicious scripts and are thus highly relevant in describing clear malicious or encrypted scripts tagged as NeedToCheck. Additional examples of the selected attributes may also include the words "jQuery" and "trackPageview", which are indicative of normal scripts and are highly relevant in describing clear normal scripts tagged as Bypass. Because variables, such as "Variable (including Function)", in scripts have different characteristics compared to words in script strings, the aforementioned 4000 highly relevant attributes may consist of 2000 variables and 2000 words.

The model generator 224 goes through the sample scripts 221 (arrow 301) and extract from the sample scripts 221 attributes that are noted in the feature set 223 (arrow 302). The extracted attributes are also referred to as "features" because the attributes are used as features of feature vectors 324 created for the sample scripts 221. More specifically, a feature vector 324 is created for each sample script 221 (arrow 303), with the feature vector 324 having features corresponding to attributes in the sample script 221 that are in the feature set 223. The feature vector 324 is also tagged as either NeedToCheck or Bypass, depending on whether the sample script 221 is a known normal script ("Bypass") or potentially malicious script ("NeedToCheck").

In one embodiment, a sample script 221 is tokenized to extract features from the sample script. For example, a sample script sentence "var joey='men'" may be tokenized into three separate attributes "var", "joey", and "men". A script may be tokenized using a lexical analyzer, such as Lex. A feature vector 324 may be created for each sample script 221 by mapping the selected attributes in the feature set 223. Each feature in the feature vector 324 corresponds to an attribute included in the feature set 223, and may have a weight computed using TF-IDF (Term Frequency-Inverse Document Frequency) algorithm, for example. In the previous example, assuming the attributes "var" and "men" (but not "joey") are attributes in the feature set 223, a feature vector 324 for the sample script 221 will have the weights of the attributes "var" and "men" in corresponding features in the feature vector 324. Assuming the TF-IDF value for "var" and "men" are 0.5 and 0.8, respectively, the feature vector 324 for the sample script 221 having the script sentence "var joey='men'" may be represented as:

[0.5,0.8]

The above described procedure of extracting features from the sample scripts 221 involves semantic analysis, i.e., analyzing the semantic characteristics of the sample scripts. In one embodiment, the lexical characteristics of the sample scripts 221 are also analyzed to increase prediction accuracy. Examples of lexical characteristics of the sample scripts 221 that may be taken into account include:

a) Length of script
b) Max string length in script
c) Statement count
d) Line count
e) Count of unknown token
f) Count of whitespace
g) Length of comment
h) Count of plus operator
i) Total length of all known token
j) Total string length
k) Percentage of char (%) at String
l) Percentage of char (u) at String
m) Percentage of char (X) at String
n) Percentage of char (/) at String
o) Total length of all tokens
p) Maximum length of any line
r) Start with comments
s) Only function declaration The lexical characteristics of the sample scripts 221 may be weighted and merged into corresponding feature vectors 324. Assuming the lexical characteristics of the sentence "var joey='men'" is represented as,

[14, 4, 1, . . . ]

the feature vector 324 for the script sentence may be represented as

[0.5, 0.8, 14, 4, 1, . . . ]

with the first two features of the feature vector 324 representing the weighted semantic characteristics of the script sentence (i.e., 0.5 and 0.8), and the remaining features of the feature vector 324 representing the weighted lexical characteristics of the script sentence.

The feature vectors 324 may be used as inputs (arrow 304) to an SVM learning algorithm employed to build (step 325) the SVM model 225 (arrow 305). In one embodiment, linear kernel SVM is used to build the SVM model 225 by training using the feature vectors 324.

FIG. 4 shows a flow diagram of a method of identifying normal scripts in accordance with an embodiment of the present invention. The steps shown in FIG. 4 may be performed by components of the client computer 230. For example, the feature extraction step (step 422) and the classification step (step 424) may be performed by the normal script identifier 244 in the client computer 230.

The feature set 223 and the SVM model 225 from the training stage are provided to the client computer 230 for use in the prediction stage. In the example of FIG. 4, the script 421 represents a script from network traffic, such as an incoming script received over the Internet as part of a web page or an outbound script. The normal script identifier 244 receives the script 421 (arrow 402) and extracts relevant features from the script 421 (step 422). The feature extraction process and the feature vector generation process are similar to those in the training stage. More specifically, the normal script identifier 244 extracts from the incoming script 421 attributes that are noted in the feature set 223 (arrow 401), for example by tokenizing the script 421. The normal script identifier 244 creates a feature vector 423 (arrow 403), having features comprising attributes of the script 421 that are noted in the feature set 223. The feature vector 423 is then used by the normal script identifier 244 (arrow 404) to classify the script 421 as either a normal script or potentially malicious script (step 424). In one embodiment, the normal script identifier 244 classifies the script 421 by inputting its corresponding feature vector 423 into the SVM model 225. The SVM model 225 classifies the feature vector 423 as belonging to the class of scripts tagged as "NeedToCheck" (i.e., potentially malicious) or the class of scripts tagged as "Bypass" (i.e., normal).

The normal script identifier 244 deems the script 421 as a normal script when the SVM model 225 classifies its corresponding feature vector 423 as belonging to the class of scripts tagged as "Bypass". Otherwise, when the SVM model 225 classifies its corresponding feature vector 423 as belonging to the class of scripts tagged as "NeedToCheck", the normal script identifier 244 deems the script 421 as potentially malicious. In that case, the normal script identifier 244 initiates evaluation of the script 421 by the anti-malware 245.

In a first experiment, a total of 3594 script samples were used to build the SVM model 225. Out of the 3594 script samples, 2682 were tagged as Bypass and the rest were tagged as NeedToCheck by inspection (i.e., manually). After training the SVM model 225, the script samples were run through the SVM model 225 again in the training computer 220 with the result shown in Table 1.

TABLE 1

|  | Total | Bypass | NeedToCheck |
| --- | --- | --- | --- |
| Bypass samples | 2682 | 2650 | 32 |
| NeedToCheck samples | 912 | 68 | 844 |

The result of Table 1 shows that over 98.8% (2650/2682) of scripts tagged as Bypass were classified correctly as Bypass scripts after training, and only less than 7.4% (68/912) scripts tagged as NeedToCheck were incorrectly classified as being Bypass scripts.

In a second experiment, the SVM model 225 was tested in the training computer 220 with testing data comprising scripts that are known to be potentially malicious (NeedToCheck scripts) and known to be normal (Bypass scripts). The result of the second experiment is shown in Table 2.

TABLE 2

|  | Total | Bypass | NeedToCheck |
| --- | --- | --- | --- |
| Bypass samples | 3811 | 3776 | 35 |
| NeedToCheck samples | 291 | 13 | 278 |

Table 2 shows that in the second experiment, 99.1% (3776/3811) of the normal scripts were classified correctly as being Bypass scripts, and only less than 4.47% (13/291) of potentially malicious scripts were incorrectly classified as Bypass scripts.

In a third experiment, the SVM model 225 is tested in the client computer 230 with live traffic comprising 16527 downloaded web pages. In the third experiment, 98.3% (72674/73939) of embedded scripts and 98.5% of outbound scripts were correctly classified as Bypass scripts.

In a fourth experiment, there were 11 malicious scripts among over 40,000 web pages received in the client computer 230, and all of these 11 malicious scripts were correctly classified as NeedToCheck scripts.

The above experiments show that embodiments of the present invention are effective in identifying normal scripts, and resulting in only 1.5% (average number in the third experiment) of scripts needing further examination, which may be performed at the client computer using an anti-malware or sent to a back-end system. Although the above experiments were performed on JavaScript scripts, embodiments of the present invention may also be employed on other scripts, such as VBScript and ActionScript at Flash to name some examples.

In light of the foregoing, those of ordinary skill in the art will appreciate that embodiments of the present invention may also be employed in applications other than identification of normal scripts. For example, embodiments of the present invention may also be employed to identify unused scripts. More particularly, HTML/Web pages include an increasing number of web page-embedded and outbound scripts. Web browsers suffer from low performance because a lot of these scripts are not used but still needs to be compiled or intercepted for use by the web browser. An example scenario includes a user who only views some news or articles and then closes the web page. Once the web page has been loaded, the web browser needs to compile and preload a lot of scripts, for example, a script to verify user input for survey forms even when the user doesn't use the forms. In that case, the script is unused and just degrades browser performance. The semantic and lexical analysis described herein may be employed to cluster scripts by specific family, and identify those that are likely to remain unused. Scripts identified to be unused may be bypassed, i.e., not compiled or intercepted for use by the web browser. The technique is similar to that of the normal script identifier except that the scripts are clustered instead of classified.

Techniques for identifying normal scripts in computer systems have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of identifying normal scripts, the method comprising:
   receiving a machine learning model and a feature set in a client computer, the machine learning model being trained using sample scripts that are known to be normal and sample scripts that are known to be potentially malicious and takes into account lexical and semantic characteristics of the sample scripts that are known to be normal and the sample scripts that are known to be potentially malicious;
   receiving a target script along with a web page in the client computer, the target script and the web page being received from a server computer over a computer network;
   extracting from the target script features that are included in the feature set;
   inputting the extracted features of the target script into the machine learning model to receive a classification of the target script from the machine learning model; and
   detecting that the target script is a normal script and not a potentially malicious script based on the classification of the target script.

2. The method of claim 1 wherein the machine learning model comprises a support vector machine (SVM).

3. The method of claim 2 wherein inputting the extracted features of the target script into the machine learning model comprises:
   forming a feature vector having features comprising the extracted features of the target script; and
   using the feature vector as an input to the support vector machine.

4. The method of claim 1 further comprising:
   in response to detecting that the target script is a normal script and not a potentially malicious script, allowing a web browser in the client computer to use the target script without having an anti-malware in the client computer first evaluate the target script.

5. The method of claim 4 wherein the machine learning model and the feature set were received by the client computer from another server computer over a computer network.

6. The method of claim 1 wherein the lexical characteristics of the sample scripts that are known to be potentially malicious and the sample scripts that are known to be normal include a count of white space in the sample scripts that are known to be potentially malicious and the sample scripts that are known to be normal.

7. The method of claim 1 wherein the target script comprises a JavaScript.

8. The method of claim 1 further comprising:
   receiving another target script in the client computer;
   detecting that the other target script is a potentially malicious script based on a classification of the other target script by the machine learning model; and
   in response to detecting that the other target script is a potentially malicious script, initiating further examination of the other target script by an anti-malware running in the client computer.

9. A client computer comprising a processor configured to execute computer-readable program code stored non-transitory in a computer-readable medium, the computer-readable medium comprising:
   a web browser;
   an anti-malware;
   a machine learning model; and
   a normal script identifier configured to receive a first script in the client computer, to determine whether the first script is a normal script by having the first script classified by the machine learning model, to allow the first script to be used by the web browser without first having the first script evaluated by the anti-malware for malicious content in response to detecting that the first script is a normal script and not a potentially malicious script, to receive a second script in the client computer, to detect that the second script is a potentially malicious script based on a classification of the second script by the machine learning model, and to initiate further examination of the second script by the anti-malware in response to detecting that the second script is a potentially malicious script.

10. The client computer of claim 9 wherein the computer-readable medium further comprises a feature set comprising attributes indicative of a normal script.

11. The client computer of claim 10 wherein the normal script identifier is further configured to extract from the first script features that are noted in the feature set.

12. The client computer of claim 9 wherein the first script is embedded in a web page.

13. A computer-implemented method of identifying normal scripts, the method comprising:
   using a machine learning model to determine a classification of a first script in a client computer;
   detecting that the first script is a normal script based on the classification of the first script;
   foregoing evaluation of the first script by an anti-malware in response to detecting that the first script is a normal script;
   receiving a second script in the client computer;
   detecting that the second script is a potentially malicious script based on a classification of the second script by the machine learning model; and
   in response to detecting that the second script is a potentially malicious script, initiating further examination of the second script by the anti-malware.

14. The method of claim 13 wherein the machine learning model comprises a support vector machine (SVM).

15. The method of claim 14 wherein using the learning model to determine the classification of the first script comprises:
- extracting from the first script features that are included in a feature set;
- forming a feature vector having features comprising the extracted features of the first script; and
- inputting the feature vector into the machine learning model to receive the classification of the first script from the machine learning model.

16. The method of claim 15 wherein the machine learning model and the feature set were received by the client computer from a server computer over a computer network.

17. The method of claim 13 wherein the first script comprises JavaScript.

18. The method of claim 13 wherein the first script was received by the client computer from a server computer hosting a website and providing a web page to the client computer.

19. The method of claim 18 were in the first script is embedded in the web page.

* * * * *